US009771891B2

(12) United States Patent
Scharp et al.

(10) Patent No.: US 9,771,891 B2
(45) Date of Patent: Sep. 26, 2017

(54) PISTON FOR AN INTERNAL COMBUSTION ENGINE

(71) Applicant: Mahle International GmbH, Stuttgart (DE)

(72) Inventors: Rainer Scharp, Vaihingen (DE); Peter Kemnitz, Leutenbach (DE)

(73) Assignee: Mahle International GmbH (DE)

( * ) Notice: Subject to any disclaimer, the term of this patent is extended or adjusted under 35 U.S.C. 154(b) by 100 days.

(21) Appl. No.: 14/894,338

(22) PCT Filed: May 28, 2014

(86) PCT No.: PCT/DE2014/000263
§ 371 (c)(1),
(2) Date: Nov. 25, 2015

(87) PCT Pub. No.: WO2014/190962
PCT Pub. Date: Dec. 4, 2014

(65) Prior Publication Data

US 2016/0115900 A1 Apr. 28, 2016

(30) Foreign Application Priority Data

May 31, 2013 (DE) ........................ 10 2013 009 164

(51) Int. Cl.
*F02F 3/00* (2006.01)
*B23P 15/10* (2006.01)
(Continued)

(52) U.S. Cl.
CPC *F02F 3/22* (2013.01); *F01P 3/08* (2013.01); *F02F 3/00* (2013.01); *F02F 3/02* (2013.01); *F02F 3/16* (2013.01); *F02F 3/20* (2013.01)

(58) Field of Classification Search
CPC ........ F02F 3/22; F02F 3/02; F02F 3/00; F02F 3/0015; F02F 3/16; F02F 3/18; F02F 3/20; F02F 5/00; F01P 3/08; F01P 3/10
(Continued)

(56) References Cited

U.S. PATENT DOCUMENTS

| | | | |
|---|---|---|---|
| 5,000,078 | A | 3/1991 | Gabele |
| 6,892,689 | B2 | 5/2005 | Bischofberger et al. |
| 2009/0071001 | A1 | 3/2009 | Kondoh et al. |

FOREIGN PATENT DOCUMENTS

| | | | |
|---|---|---|---|
| DE | 3713242 | C1 | 10/1988 |
| DE | 10040486 | A1 | 3/2002 |

(Continued)

OTHER PUBLICATIONS

English abstract for JP-09317554.
(Continued)

*Primary Examiner* — Syed O Hasan
(74) *Attorney, Agent, or Firm* — Fishman Stewart PLLC

(57) ABSTRACT

A piston for an internal combustion engine may include a piston head and a piston skirt. The piston head may include a piston crown, a circumferential fire land, a circumferential ring belt having a plurality of ring grooves, and a circumferential cooling duct. The cooling duct may be open in a direction away from the fire land and may be at least partially closed by a closure element. The cooling duct may include a cooling duct bottom and a cooling duct ceiling. The piston skirt may have at least two piston bosses connected to one another via at least two running faces. At least one running face may have an inner face connected via a connecting land to an underside of the piston head.

20 Claims, 4 Drawing Sheets

(51) Int. Cl.

| | |
|---|---|
| ***F01P 1/04*** | (2006.01) |
| ***F02F 3/22*** | (2006.01) |
| ***F02F 3/16*** | (2006.01) |
| ***F02F 3/20*** | (2006.01) |
| ***F01P 3/08*** | (2006.01) |
| ***F02F 3/02*** | (2006.01) |

(58) Field of Classification Search
USPC .......... 123/193.6, 41.39; 29/888.04, 888.049
See application file for complete search history.

(56) References Cited

FOREIGN PATENT DOCUMENTS

| | | | |
|---|---|---|---|
| DE | 10063568 | A1 | 7/2002 |
| DE | 10132446 | A1 | 1/2003 |
| DE | 102004003980 | A1 | 8/2005 |
| DE | 102008046115 | A1 | 3/2009 |
| JP | 09317554 | | 12/1997 |
| JP | 2005-069219 | A | 3/2005 |
| WO | WO-2012083929 | A2 | 6/2012 |

OTHER PUBLICATIONS

English abstract for DE-102004003980.
English abstract for DE-10132446.
English abstract for DE-10047258.
English abstract for DE-10040486.
German Search Report for DE-102013009164.0, dated Jul. 10, 2013.
English abstract for JP2005-69219.

PISTON FOR AN INTERNAL COMBUSTION ENGINE

CROSS-REFERENCE TO RELATED APPLICATIONS

This application claims priority to German Patent Application No. 10 2013 009 164.0, filed May 31, 2013, and International Patent Application No. PCT/DE2014/000263, filed May 28, 2014, both of which are hereby incorporated by reference in their entirety.

TECHNICAL FIELD

The present invention relates to a piston for an internal combustion engine, having a piston head and a piston skirt, the piston head having a piston crown, a circumferential fire land, a circumferential ring belt with ring grooves and, in the region of the ring belt, a circumferential cooling duct which is open toward the bottom and is closed by way of a closure element, the cooling duct having a cooling duct bottom and a cooling duct ceiling, and the piston skirt having two piston bosses which are connected to one another via two running faces.

BACKGROUND

In modern internal combustion engines, the pistons are subjected to ever higher mechanical and thermal loads in the region of the piston crown and the combustion bowl. In addition to optimization of the piston cooling, it is therefore necessary to provide the piston firstly with the necessary stability, in order to withstand the mechanical loads which occur, and secondly to design the piston to be so flexible that damage, in particular cracks, are avoided which might be caused by way of said mechanical loads.

SUMMARY

It is the object of the present invention to develop a piston of the generic type in such a way that an optimized balance between stability and flexibility is achieved and at the same time the cooling is improved.

The object is achieved by virtue of the fact that the inner face of exclusively one running face of the piston is connected via a connecting land to the underside of the piston head.

The piston according to the invention is therefore of asymmetrical construction. One of its running faces is attached to the two piston bosses. The other running face is additionally attached to the underside of the piston head. This construction ensures both satisfactory stability (additional attachment of one running face to the underside of the piston head), but secondly also a certain flexibility (attachment of one running face merely to the piston bosses). It is unimportant here whether the additional attachment of one running face to the underside of the piston head is provided on the pressure side or on the counter pressure side of the piston. Furthermore, the connecting land which connects one of the running faces to the underside of the piston head can be used to direct an oil jet onto the surface of the connecting land in a targeted manner during engine operation, in such a way that the underside of the piston head is cooled in a targeted manner. In this way, the cooling of the piston according to the invention is also improved.

Advantageous developments result from the subclaims.

The compression height can be, for example, between 38% and 45% of the nominal diameter of the piston head.

One advantageous development provides that the closure element is arranged in the piston head in such a way that a circumferential annular gap is configured in the piston crown. This dispenses with the necessity of providing oil outlet openings.

If the piston skirt is decoupled, the closure element can be configured as a separate component which is fastened to the piston.

The piston according to the invention can be configured as a single-piece piston. The cooling duct is then made in a cast or forged blank in a manner known per se by way of machining. It is preferred, however, that the piston is assembled from at least two components which are connected non-releasably to one another. In particular, the piston according to the invention can have a main piston body and a piston ring element. In this case, the closure element can be configured both as a separate component which is fastened to the piston and as a component which is connected in one piece to the piston. In the latter case, the closure element can be connected in one piece either to the main piston body or to the piston ring element.

The cooling duct can extend in the axial direction as a rule as far as the height of the lowermost ring groove and below, in order to achieve sufficient cooling, in particular of steel pistons, during engine operation with the aid of a cooling duct which is as large as possible. However, on account of the cocktail shaker effect, the cooling oil moves to and fro between the cooling duct ceiling, that is to say a very hot region, and the cooling duct bottom, that is to say a comparatively cool region. On account of the considerably lower temperatures in the region of the cooling duct bottom, in practice heat absorption from the piston head into the cooling oil no longer takes place there.

Particularly effective cooling is therefore preferably achieved by virtue of the fact that the cooling duct is shortened in the axial direction. As a consequence, the cooling oil moves, in particular in the region of the cooling duct bottom, in closer proximity to the highly thermally loaded cooling duct bottom and therefore overall in hotter regions than in a cooling duct which extends as far as the lowermost ring groove or below. Heat absorption from the hot regions of the piston head into the cooling oil therefore takes place in every phase of the piston movement. Particularly effective cooling of the piston head results, in particular, if the cooling oil quantity which is known from the prior art is retained and the cooling oil supply is set up in such a way that the cooling oil is exchanged rapidly during engine operation.

The cooling duct bottom is preferably arranged at the level of the second ring groove, particularly preferably between the first ring groove and the second ring groove, in order to further increase the cooling performance by the cooling oil moving in even greater proximity to the hot piston crown during engine operation.

A further preferred development provides that the height of the fire land is at most 9% of the nominal diameter of the piston head. In this way, positioning of the cooling duct in relation to the piston crown and the ring belt which is particularly advantageous for the dissipation of heat is brought about.

In this case, the spacing between the piston crown and the cooling duct bottom can be between 11% and 17% of the nominal diameter of the piston head. In addition or instead, the height of the cooling duct can be from 0.8 times to 1.7 times its width. Furthermore, as an alternative or in addition to this, the spacing between the piston crown and the cooling duct ceiling can be between 3% and 7% of the nominal diameter of the piston head. These dimension rules permit an optimized design and positioning of the cooling duct for all piston sizes.

A further particularly preferred embodiment consists in that a combustion bowl is configured in the piston head, and that the smallest wall thickness in the radial direction between the combustion bowl and the cooling duct is between 2.5% and 4.5% of the nominal diameter of the piston head. An improved thermal transfer between the combustion bowl and the cooling duct is achieved in this way.

The combustion bowl can be provided, for example, with an undercut, in order to define the wall thickness between the combustion bowl and the cooling duct.

The present invention is suitable both for pistons made from at least one steel material and for pistons made from at least one light metal alloy.

BRIEF DESCRIPTION OF THE DRAWINGS

In the following text, exemplary embodiments of the present invention will be explained in greater detail using the appended drawings, in which, in a diagrammatic illustration which is not true to scale.

DETAILED DESCRIPTION

Figure 1:
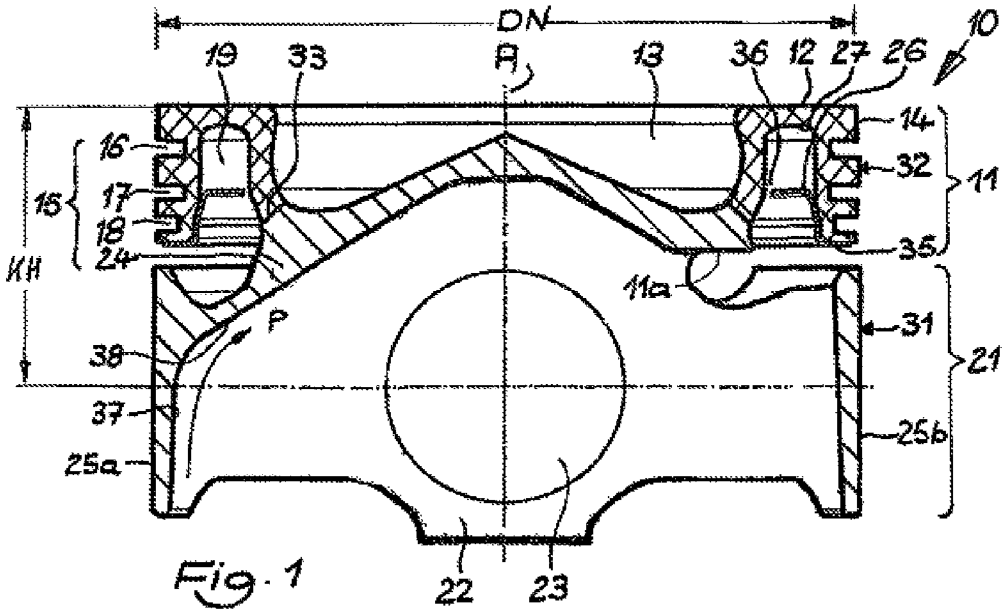
FIG. 1 shows a first exemplary embodiment of a piston according to the invention in section.
Figure 2:
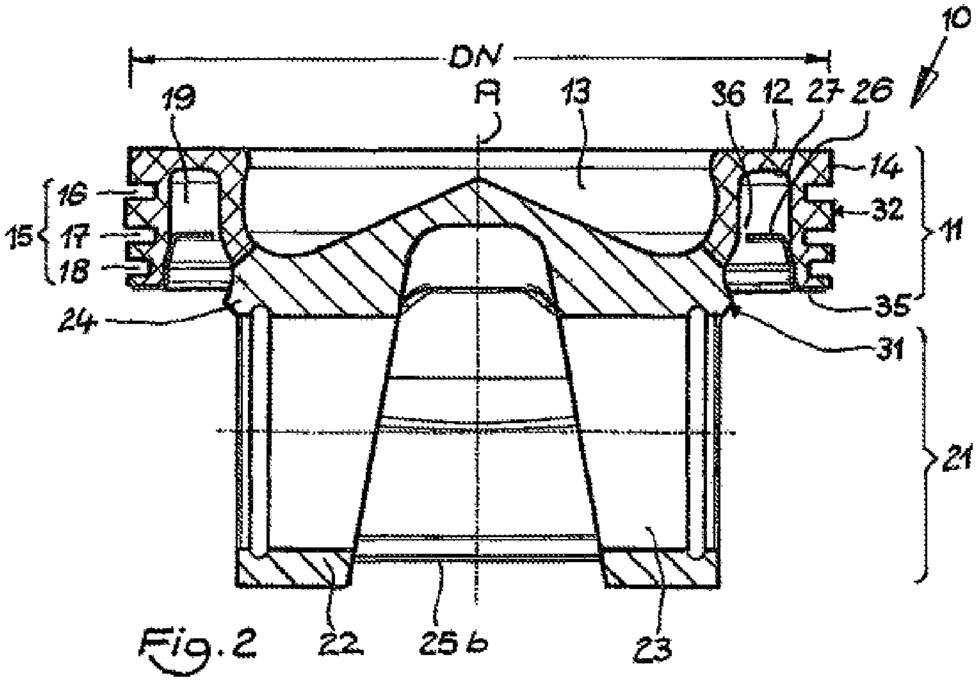
FIG. 2 shows the piston according to FIG. 1 in an illustration which has been rotated by 90°.

FIGS. 1 and 2 show a first exemplary embodiment of a piston 10 according to the invention. As is generally known, the piston 10 can be forged or cast as a single-piece blank, the cooling duct being introduced into the blank by way of machining. In the exemplary embodiment, the piston 10 is assembled from a main piston body 31 and a piston ring element 32 which can be cast or forged in a manner known per se and are connected to one another via a welded seam 33, for example by means of electron beam welding or laser welding. In the exemplary embodiment, the welded seam 33 is arranged at the lowest point of the combustion bowl at an acute angle with respect to the piston center axis A. In the exemplary embodiment, the piston 10 is produced from a steel material. However, it can also be produced from a light metal material or a combination of both materials.

The piston 10 has a piston head 11 with a piston crown 12 which has a combustion bowl 13, a circumferential fire land 14 and a circumferential ring belt 15 with ring grooves 16, 17, 18 for receiving piston rings (not shown). A circumferential cooling duct 19 is provided at the level of the ring belt 15.

Furthermore, the piston 10 has a piston skirt 21 which is decoupled thermally from the piston head 11 with piston bosses 22 and boss bores 23 for receiving a gudgeon pin (not shown). The piston bosses 22 are connected via boss attachments 24 to the underside 11*a* of the piston head 11. The piston bosses 22 are connected to one another via running faces 25*a*, 25*b*.

The cooling duct 19 is configured such that it is open at the bottom and is closed by way of a separate closure element 35, a closure plate in the exemplary embodiment. The closure element 35 is fastened to the piston head 11 in a manner known per se below the ring belt 15 and extends in the direction of the combustion bowl 13 in such a way that the annular free end of the closure element 35 forms a circumferential annular gap 36 together with the outer wall of the combustion bowl 13.

According to the invention, the inner face 37 of exclusively one running face, namely the running face 25*a* of the piston 10, is connected via a connecting land 38 to the underside 11*a* of the piston head 11.

During engine operation, a cooling oil jet can be directed along the inner face 37 of the running face 25*a* in the direction of the surface of the connecting land 38, in order to improve the cooling of the underside 11*a* of the piston head 11, as indicated by the arrow P.

For further improvement of the cooling of the piston 10, the closure element 35 is curved in the direction of the piston crown 12 in such a way that a cooling duct bottom 26 is formed which lies approximately at the level of the second ring groove 17 in the exemplary embodiment. The cooling duct bottom 26 can also be arranged between the first ring groove 16 and the second ring groove 17.

Furthermore, the cooling duct 19 has a cooling duct ceiling 27.

In the exemplary embodiment, the compression height KH is between 38% and 45% of the nominal diameter DN of the piston head 11.

Figure 3:
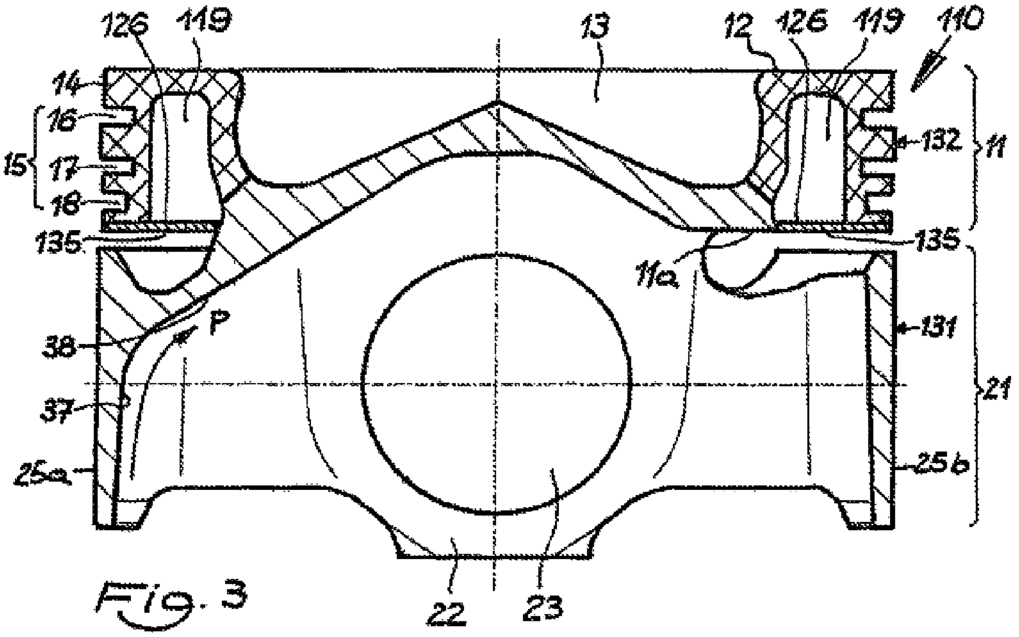
FIG. 3 shows a further exemplary embodiment of a piston according to the invention in section.

FIG. 3 shows a further exemplary embodiment of a piston 110 according to the invention. The piston 110 is constructed in a similar way to the piston 10 according to FIGS. 1 and 2. Structural elements which coincide are therefore provided with the same designations, and reference is made in this regard to the description with respect to FIGS. 1 and 2.

The essential difference between the piston 110 according to FIG. 3 and the piston 10 according to FIGS. 1 and 2 consists in the fact that the closure element 135 is configured as an annular disk which completely closes the cooling duct 119. In this case, inlet and outlet openings for cooling oil are provided in the closure element 135. The cooling duct bottom 126 of the resulting cooling duct 119 therefore lies approximately at the level of the lowermost ring groove 18.

Figure 4:
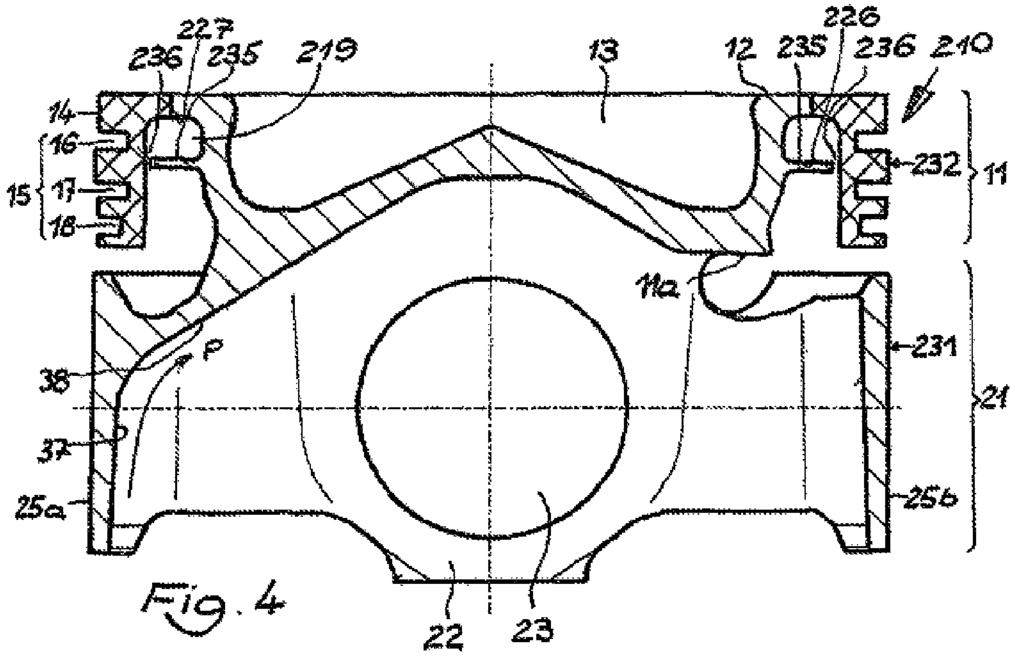
FIG. 4 shows a further exemplary embodiment of a piston according to the invention in section.

FIG. 4 shows a further exemplary embodiment of a piston 210 according to the invention. The piston 210 is constructed in a similar way to the piston 10 according to FIGS. 1 and 2. Structural elements which coincide are therefore provided with the same designations, and reference is made in this regard to the description with respect to FIGS. 1 and 2.

The essential differences consist firstly in the design of the main piston body 231 and the piston ring element 232 and secondly in the fact that the piston 210 has a closure element 235 of different design in comparison with the piston 10 according to FIGS. 1 and 2.

The piston 210 has a closure element 235 in the form of a circumferential flange which is connected in one piece to the main piston body 231. The closure element 235 extends in the direction of the ring belt 15 in such a way that its free end forms a circumferential annular gap 236 together with the inner wall of the ring belt 15. The closure element 235 forms the cooling duct bottom 226. In the exemplary embodiment, the cooling duct bottom 226 lies approximately between the first ring groove 16 and the second ring groove 17. Furthermore, the cooling duct 219 has a cooling duct ceiling 227.

In the exemplary embodiment, the piston ring element 232 of the piston 210 comprises a part of the piston crown 12, the fire land 14 and the ring belt 15. The piston ring element 232 can be connected to the main piston body 231, in particular, by way of a welding method, for example electron beam welding or laser welding, the welded seam 233 being arranged in the piston crown.

Figure 5:
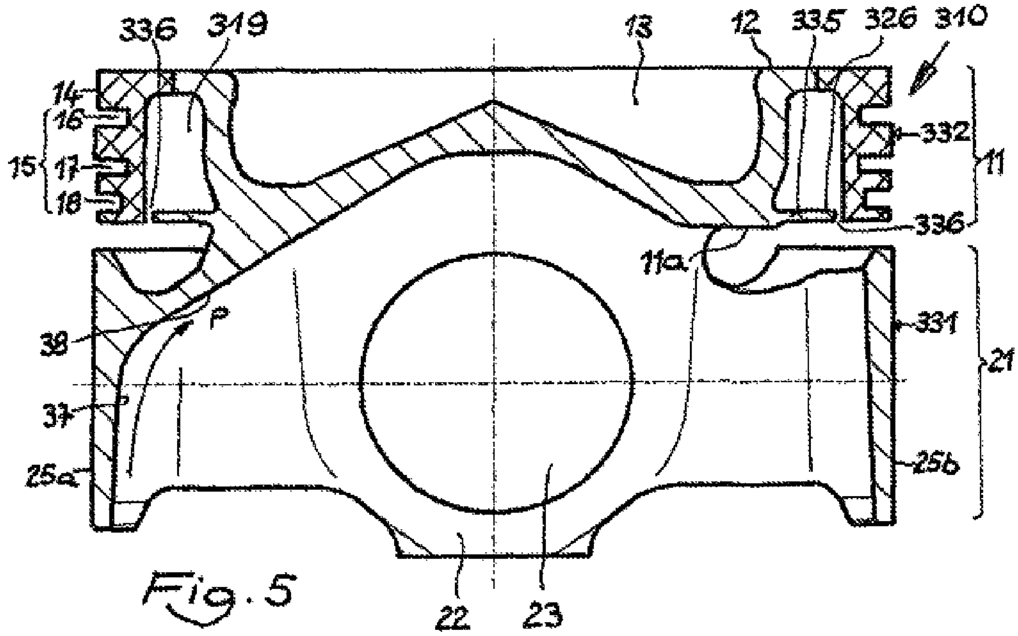
FIG. 5 shows a further exemplary embodiment of a piston according to the invention in section.

FIG. 5 shows a further exemplary embodiment of a piston 310 according to the invention. The piston 310 is constructed in a similar way to the piston 210 according to FIG. 4. Structural elements which coincide are therefore provided with the same designations, and reference is made in this regard to the description with respect to FIG. 4.

The essential difference between the piston 310 according to FIG. 5 and the piston 210 according to FIG. 4 consists in the fact that the closure element 335 is connected in one piece to the main piston body 331 in such a way that the cooling duct bottom 326 of the resulting cooling duct 319 lies approximately at the level of the lowermost ring groove 18. The closure element 335 extends in the direction of the ring belt 15 which is formed by the piston ring element 332, in such a way that the free end of said closure element 335 forms a circumferential annular gap 336 together with the inner wall of the ring belt 15.

Figure 6:
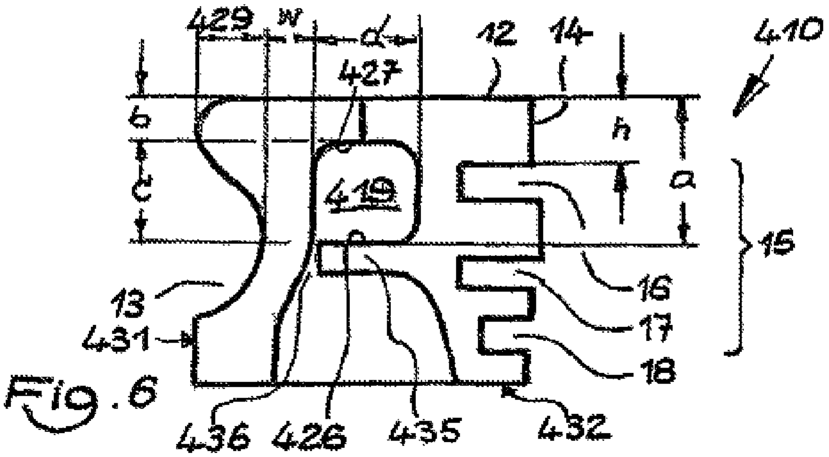
FIG. 6 shows an enlarged partial illustration of a further exemplary embodiment in section.

FIG. 6 shows an enlarged partial illustration of a further exemplary embodiment of a piston 410, in which the closure element 435 is configured in the form of a circumferential flange which is connected in one piece to the piston ring element 432. The closure element 435 extends in the direction of the combustion bowl 13 which is formed by the main piston body 431, in such a way that the free end of the closure element 435 forms a circumferential annular gap 436 together with the outer wall of the combustion bowl 13.

The combustion bowl 13 is provided with an undercut 429, in order to determine the wall thickness between the combustion bowl 13 and the cooling duct 419 (see below in this regard).

The following details apply to pistons 10, 210, 410 according to FIGS. 1, 2, 4 and 6.

It is preferred that the height h of the fire land 14 is at most 9% of the nominal diameter DN of the piston head 11 (see FIGS. 1 and 2). In this way, positioning of the cooling duct 419 in relation to the piston crown 12 and the ring belt 15 which is particularly advantageous for the dissipation of heat is brought about.

On the basis of this dimension rule for the fire land 14, it is preferred that the spacing a between the piston crown 12 and the cooling duct bottom 426 is between 11% and 17% of the nominal diameter DN of the piston head 11 (see FIGS. 1 and 2). In this way, the cooling duct 419 is positioned in optimum proximity to the hot piston crown 12 and in an optimum position relative to the cooler ring grooves 16, 17, 18.

Moreover, it is preferred that the height c of the cooling duct 419 is from 0.8 times to 1.7 times its width d. Said dimension rule brings about an optimum volume of the cooling duct 419 and an optimum orientation relative to the hot combustion bowl 13, in particular to the bowl edge, and to the hot piston crown 12 and to the cooler ring grooves 16, 17, 18.

Finally, it is preferred that the spacing b between the piston crown 12 and the cooling duct ceiling 427 is between 3% and 7% of the nominal diameter DN of the piston head 11 (cf. FIGS. 1 and 2). Said dimension rule also brings about optimum positioning of the cooling duct 419 in relation to the hot piston crown 12.

Ultimately, it is preferred that the lowest wall thickness w in the radial direction between the combustion bowl 13 and the cooling duct 419 is between 2.5% and 4.5% of the nominal diameter DN of the piston head 11. An improved thermal transfer between the combustion bowl 13 and the cooling duct 419 is achieved in this way.

Figure 7A:
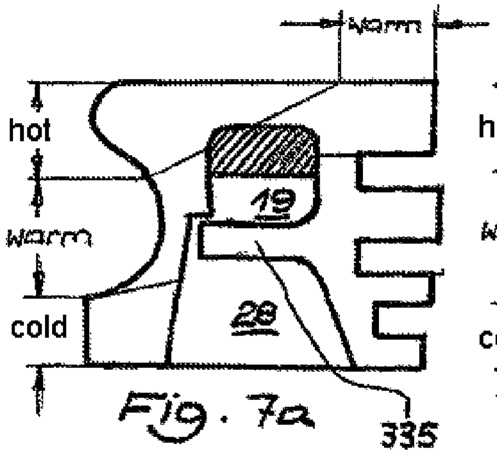
FIGS. 7*a*, 7*b* show a diagrammatic illustration of the cooling oil movement in a piston according to the present invention.
Figure 7B:
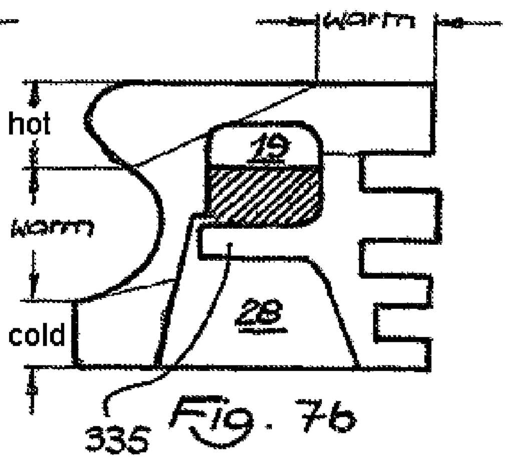
Figure 8A:
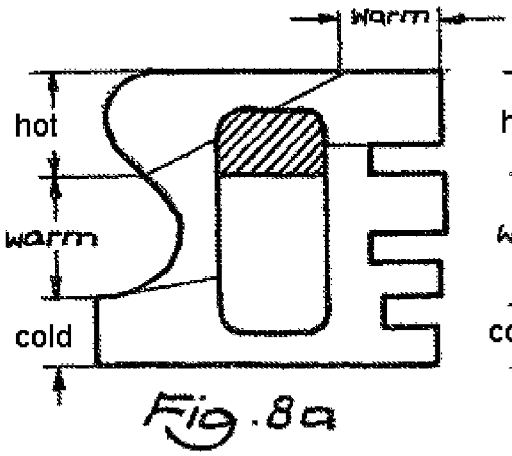
FIGS. 8*a*, 8*b* show a diagrammatic illustration of the cooling oil movement in a piston according to the prior art.
Figure 8B:
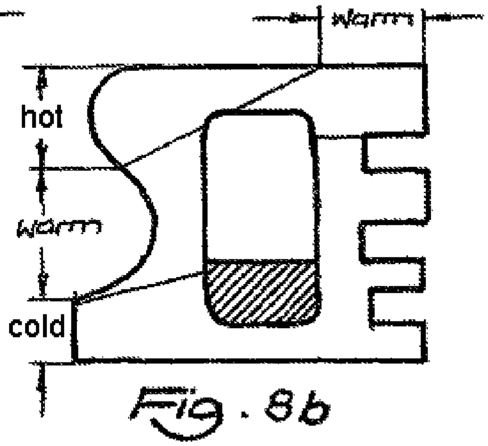

FIGS. 7*a* and 7*b* and 8*a* and 8*b* diagrammatically show the cooling oil movement during engine operation and the temperature zones in the region of the combustion bowl, the piston crown, the cooling duct and the ring grooves both for a piston according to the invention with an axially shortened cooling duct (FIGS. 7*a* and 7*b*) and for a piston with a cooling duct which extends over all three ring grooves (FIGS. 8*a* and 8*b*).

In FIGS. 7*a*, 7*b*, 8*a*, 8*b*, three heat zones are indicated diagrammatically, namely “hot”, “warm” and “cool”. The relative temperature differences in the individual piston regions are intended to be illustrated in this way.

According to FIGS. 7*a* and 7*b*, the cooling duct is shortened in the axial direction. As a consequence, the cooling oil moves almost exclusively along the “hot” regions of the piston crown and the combustion bowl. An absorption of heat from the “hot” regions of the piston head into the cooling oil therefore takes place in every phase of the piston movement. The usual cooling oil quantity should be retained and the engine management should be set up in such a way that the cooling oil is exchanged rapidly during engine operation.

According to FIGS. 8*a* and 8*b*, the cooling duct extends in the axial direction approximately as far as the level of the lowermost ring groove or else under this, in order to achieve sufficient cooling during engine operation with the aid of a cooling duct which is as large as possible. On account of the cocktail shaker effect, the cooling oil moves between a “hot” region, namely the piston crown and the bowl edge of the combustion bowl, and a “cool” region, namely the cooling duct bottom. On account of the considerably lower temperatures in the region of the cooling duct bottom, in practice heat absorption from the piston head into the cooling oil no longer takes place there.

As a consequence, further improved cooling of the piston head results in the case of pistons with an axially shortened cooling duct.

The invention claimed is:

1. A piton for an internal combustion engine, comprising: a piston head and a piston skirt together defining a reciprocating axis; the piston head including a piston crown, a circumferential fire land, a circumferential ring belt including a plurality of ring grooves, and a circumferential cooling duct disposed radially inwards of the circumferential ring belt with respect to the reciprocating axis, wherein the circumferential cooling duct is open in a direction away from the circumferential fire land and is at least partially closed by a closure element, the circumferential cooling duct including a cooling duct bottom and a cooling duct ceiling; the piston skirt including at least two piston bosses connected to one another via at least two running faces, wherein one running face of the at least two running faces has an inner face connected via a connecting land to an underside of the piston head; wherein the piston head and the piston skirt together define a compression eight, the compression height ranging between 38% and 45% of a nominal diameter of the piston head; and wherein the circumferential fire land has an axial extent with respect to the reciprocating axis that is 9% or less than the nominal diameter of the piston head.

2. The piston as claimed in claim 1, wherein the closure element is arranged in the piston head to define a circumferential annular gap at the cooling duct bottom.

3. The piston as claimed in claim 1, wherein the closure element is configured as a separate component from the piston head.

4. The piston as claimed in 1, wherein the piston head and the piston skirt are configured as at least two components connected non-releasably to one another.

5. The piston as claimed in claim 4, wherein the at least two components include a main piston body and a piston ring element.

6. The piston as claimed in claim 5, wherein the closure element is configured in one piece with the main piston body.

7. The piston as claimed in claim 5, wherein the closure element is configured in one piece with the piston ring element.

8. The piston as claimed in claim 1, wherein the closure element is arranged in the piston head to define the cooling duct bottom in a position above a lowermost ring groove of the plurality of ring grooves.

9. The piston as claimed in claim 8, wherein the cooling duct bottom is arranged between a first ring groove and a second ring groove of the plurality of ring grooves, and wherein the first ring groove and the second ring groove are positioned towards the piston crown in relation to the lowermost ring groove.

10. The piston as claimed in claim 1, wherein an axial extent between the piston crown and the cooling duct bottom with respect to the reciprocating axis is between 11% and 17% of the nominal diameter of the piston head.

11. The piston as claimed in claim 1, wherein the circumferential cooling duct defines a height in an axial direction and a width in a radial direction with respect to the reciprocating axis, and wherein the height of the circumferential cooling duct is from 0.8 times to 1.7 times the width of the circumferential cooling duct.

12. The piston as claimed in claim 1, wherein an axial extent between the piston crown and the cooling duct ceiling with respect to the reciprocating axis is between 3% and 7% of the nominal diameter of the piston head.

13. The piston as claimed in claim 1, wherein the piston head further includes a combustion bowl, and wherein the piston head defines a wall thickness in a radial direction with respect to the reciprocating axis between the combustion bowl and the circumferential cooling duct ranging from 2.5% to 4.5% of the nominal diameter of the piston head.

14. The piston as claimed in claim 13, wherein the combustion bowl includes an undercut extending in a radial direction of the piston head with respect to the reciprocating axis.

15. A piston for an internal combustion engine, comprising: a piston head and a piston skirt together defining a reciprocating axis; the piston head including: a piston crown; a combustion bowl; a circumferential fire land; a circumferential ring belt positioned away from a region of combustion in relation to the circumferential fire land, the circumferential ring belt including a plurality of ring grooves; and an annular cooling duct disposed radially inwards of the circumferential ring belt with respect to the reciprocating axis, wherein the annular cooling duct is open in a direction away from the circumferential fire land and is at least partially closed by a closure element, the closure element defining a cooling duct bottom positioned away from the circumferential fire land in relation to a cooling duct ceiling; the piston skirt including at least two piston bosses connected to one another via at least two running faces, and wherein one running face of the at least two running faces has a radially inner face connected via a connecting land to an axial underside of the piston head with respect to the reciprocating axis; and wherein the closure element is arranged on the piston head to define a circumferential annular gap in the annular cooling duct, and wherein the closure element is configured to position the cooling duct bottom above a lowermost ring groove in a region of an intermediate ring groove of the plurality of ring grooves in relation to the region of combustion.

16. The piston as claimed in claim 15, wherein the circumferential annular gap is provided between the cooling duct bottom defined by the closure element and a wall of the combustion bowl.

17. The piston as claimed in claim 15, wherein the closure element is coupled to the circumferential ring belt and is curved in a direction of the piston crown.

18. A piston having a center axis for an internal combustion engine, comprising: a piston head including a piston crown, a circumferential fire land, a circumferential ring belt positioned away from a region of combustion in relation to the circumferential fire land the circumferential ring belt including a plurality of ring grooves, and an annular cooling duct disposed radially inwards of the circumferential ring belt with respect to the center axis, the annular cooling duct configured open in a direction away from the circumferential fire land; a closure element at least partially closing the annular cooling duct and defining a cooling duct bottom positioned away from the circumferential fire land in relation to a cooling duct ceiling, the closure element extending from a bottom of the circumferential ring belt towards the piston crown and is arranged in the piston head to provide a circumferential annular gap at the cooling duct bottom; a piston skirt including at least two piston bosses connected to one another via at least two running faces, and a connecting land connecting a radially inner face of one of the at least two running faces, and a connecting land connecting a radially inner face of one of the at least two running faces to an axial underside of the piston head with respect to the reciprocating axis; and wherein the cooling duct bottom of the closure element is positioned at a level of an intermediate ring groove of the plurality of ring grooves.

19. The piston as claimed in claim 18, wherein the closure element is connected integrally with the piston head.

20. The piston as claimed in claim 18, wherein the plurality of ring grooves include a first ring groove, a second ring groove defining the intermediate ring groove, and a third ring groove disposed away from the piston crown in relation to the first ring groove, and wherein the cooling duct bottom is arranged at a level of the second ring groove.

* * * * *